United States Patent [19]

Hayashi et al.

[11] Patent Number: 4,663,205
[45] Date of Patent: May 5, 1987

[54] THERMOCOUPLE PROTECTIVE TUBE

[75] Inventors: Yoshiro Hayashi; Yoshio Ekino; Isamu Yuki; Masahiro Taguchi, all of Toyota, Japan

[73] Assignee: Toyota Jidosha Kabushiki Kaisha, Toyota, Japan

[21] Appl. No.: 863,186

[22] Filed: May 14, 1986

[30] Foreign Application Priority Data

May 16, 1985 [JP] Japan ................................. 60-104724

[51] Int. Cl.$^4$ .......................... B32B 1/08; H01L 35/02
[52] U.S. Cl. .......................................... 428/36; 428/35; 428/212; 428/220; 428/325; 136/230; 264/60; 427/372.2
[58] Field of Search ................. 428/220, 332, 402, 36, 428/35, 428, 325, 202; 136/230, 232; 264/60; 427/372.2

[56] References Cited

U.S. PATENT DOCUMENTS 1,773,826  8/1930  Simms ............................ 136/232 X
2,177,046 10/1939  Sweo ............................. 136/230 X Primary Examiner—Alexander S. Thomas
Attorney, Agent, or Firm—Oblon, Fisher, Spivak, McClelland & Maier

[57] ABSTRACT

A durable protective tube for a thermocouple having an extended serviceable life is obtained by covering a tubular preform of ceramic material with a refractory coating. The refractory coating is an alternate arrangement of one or more fine refractory layers of fine particulate refractory material having a particle size of 150 mesh to 500 mesh and one or more coarse refractory layers of coarse particulate refractory material having a particle size of 0.1 mm to 2.0 mm. The refractory coating is prepared by alternately applying a slurry of fine refractory particulates in a colloidal silica or ethyl silicate hydrolyzate binder and then coarse refractory particulates on the outer surface of the tubular preform followed by optional sintering.

8 Claims, 3 Drawing Figures

THERMOCOUPLE PROTECTIVE TUBE

BACKGROUND OF THE INVENTION

This invention relates to protective tubes into which thermocouples are inserted in applications of measuring the temperature of hot gases and hot liquids such as molten metal.

In many fields of the art, thermocouples, for example, platinum-platinum rhodium or Alumel-Chromel thermocouples are widely used to measure the temperature of various media including hot gases and hot liquids such as molten metal. If thermocouples are used with their conductors uncovered, they undergo considerable deterioration by physical and chemical interactions with the contacting liquid or gas and cease to perform within a very shortened period of service. Thus, the thermocouples are generally placed in insulating tubes which are, in turn, placed in protective tubes and they are exposed along with the associated insulating and protective tubes to the medium the temperature of which is to be measured, i.e., under observation. Commonly used thermocouple protective tubes are metal tubes. Protective tubes of metal material are, however, short of heat resistance particularly when the medium under observation is a molten iron or nickel-based metal at high temperatures. Protective tubes of non-metallic material are generally used in such applications.

There are known many thermocouple protective tubes of non-metallic material. Typical non-metallic materials and the ordinary and maximum service temperatures of protective tubes made therefrom are shown in Table 1.

TABLE 1

| Material | Ordinary Temp., °C. | Maximum Temp., °C. |
|---|---|---|
| Opaque quartz, transparent quartz | 1,000 | 1,000 |
| Mullite | 1400–1500 | 1500–1600 |
| Recrystallized alumina | 1,600 | 1,800 |
| Cermet chromium-alumina | 1,300 | 1,400 |
| Cermet cermotherm | 1,600 | 2,200 |
| Recrystallized silicon carbide | 1,650 | — |
| Self-cemented silicon carbide | 1,650 | 2,300 |
| Silicon carbide | 1500–1550 | 1700–1750 |
| Zirconia | 1,900 | 2,400 |

When it is desired to continuously carry out the temperature measurement of high temperature molten metal such as molten iron or nickel-based metal, those protective tubes having a higher maximum service temperature, for example, protective tubes of zirconia and recrystallized alumina must be chosen among the protective tubes of non-metallic material listed in Table 1. These prior art protective tubes must be fully preheated before immersion into the liquid metal because cracking will otherwise occur due to a thermal shock upon immersion. When the protective tube is then removed from the liquid metal, some liquid can be entrained on the periphery of the protective tube. The shrinkage stress upon cooling of the liquid adhered would also induce cracks in the protective tube. Because of the frequent cracking failure, most protective tubes, once used, become useless. Since any protective tubes inevitably undergo attack or erosion by the liquid metal or slag to a more or less extent, the life of the protective tubes is also limited by such erosion.

Since all the aforementioned protective tubes having higher maximum service temperatures are expensive, it is a matter of great interest to extend the life of protective tubes to save the consumption thereof. One solution in the prior art is to uniformly preheat the entire protective tube by a carefully controlled preheating process before it is immersed into liquid metal. The preheating step itself is an extra step and adds to the cost of operation. Another solution is used where continuous temperature measurement is necessary as in holding furnaces. Operation is controlled such that the level of liquid metal is maintained as constant as possible or the furnace is not emptied of upon tapping of liquid metal in order to ensure continuous immersion of protective tubes in liquid metal. Then the protective tubes experience minimized thermal cycling and have less opportunities of being contacted with the surface of liquid metal. The degree of freedom of operation is undesirably reduced by this method. Either of these methods can extend the life of protective tube only to some extent and is thus not virtually satisfactory.

SUMMARY OF THE INVENTION

It is, therefore, an object of the present invention to provide a novel and improved thermocouple protective tube which has outstandingly improved resistances to thermal shock and to erosion by liquid metal and thus can be used more times and for a longer serviceable life as compared with the prior art tubes.

Another object of the present invention is to provide a process for making the thermocouple protective tube of quality.

We have discovered that when a slurry of fine particulate refractory material and then coarse particulate refractory material are alternately applied plural times onto the outer surface of a tubular preform composed of any ceramic material commonly used in the preparation of prior art protective tubes, for example, recrystallized alumina and mullite to thereby form a coating of alternately laminated plies of fine particulate refractory layer and coarse particulate refractory layer on the tubular preform surface, the resulting protective tube exhibits outstandingly improved resistance to thermal shock and to erosion by molten metal.

According to a first aspect of the present invention, there is provided a protective tube for a thermocouple comprising a tubular preform of ceramic material, wherein (a) at least one fine refractory layer comprising a finely divided refractory material having a particle size ranging from 150 mesh (0.105 mm) to 500 mesh (0.028 mm) and (b) at least one coarse refractory layer comprising a coarsely divided refractory material having a particle size ranging from 0.1 mm to 2.0 mm are alternately laminated on the outer surface of the tubular preform.

Preferably, more than one fine refractory layer and more than one coarse refractory layer are coated. Both the finely and coarsely divided refractory materials are selected from zircon, high alumina, mullite, and zirconia, and mixtures thereof. They may be the same or different.

According to another aspect of the present invention, there is provided a process of making a protective tube for a thermocouple. In the present process, a slurry of a finely divided refractory material having a particle size ranging from 150 mesh to 500 mesh and then a coarsely divided refractory material having a particle size ranging from 0.1 mm to 2 mm are alternately applied onto the outer surface of a tubular preform of ceramic material to form a plurality of coating layers thereon. Optionally, the coated preform is sintered at a temperature of at least 800° C.

Preferably, the slurry contains colloidal silica or a hydrolyzate of ethyl silicate as a binder.

BRIEF DESCRIPTION OF THE DRAWINGS

The above and other objects, features, and advantages of the invention will appear more fully from the following description taken in conjunction with the accompanying drawings, in which.

DESCRIPTION OF THE PREFERRED EMBODIMENTS

Figure 1:
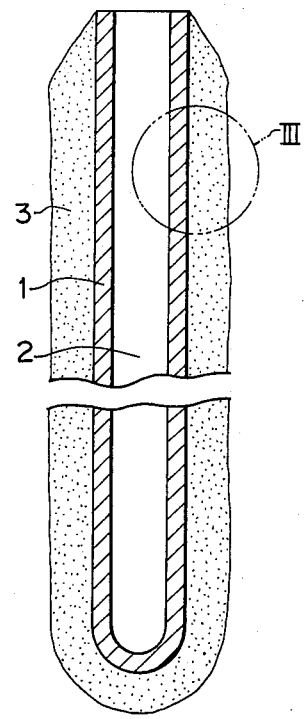
FIG. 1 is an axial cross-sectional view of a thermocouple protective tube according to one embodiment of the present invention.
Figure 2:
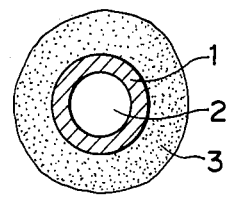
FIG. 2 is a transverse cross-sectional view of the protective tube shown in FIG. 1.
Figure 3:
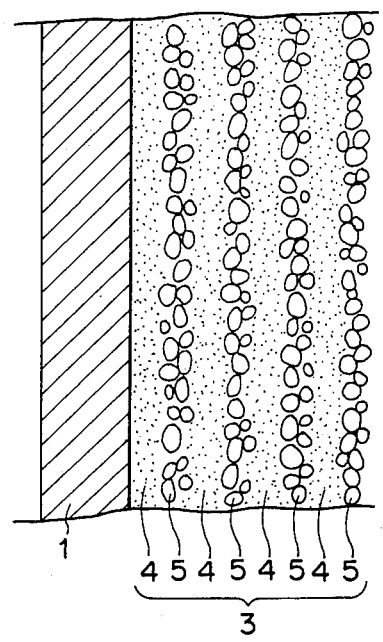
FIG. 3 is an enlarged view of a portion of the protective tube surrounded by circle III in FIG. 1.

Referring to FIGS. 1 to 3, numeral 1 designates a tubular preform of a ceramic material having a duct 2 which is axially extended therethrough for allowing a thermocouple to be inserted therein. The tubular preform 1 has a closed lower end. That is, the preform 1 is a bottom-closed hollow tubular member. The tubular preform 1 may be prepared from any of well-known ceramic materials commonly used in the preparation of conventional thermocouple protective tubes, for example, recrystallized alumina, mullite, zirconia, zircon, and high alumina. The tubular ceramic preform 1 may be prepared by any of well-known techniques generally used to form usual ceramic shapes, for example, by adding suitable binder and sintering aids to starting powder, molding the powder, and sintering at high temperatures. The process of forming the tubular ceramic preform 1 is not critical to the present invention.

On the outer surface of the tubular ceramic preform 1 is formed a refractory coating 3 characteristic of the present invention. The refractory coating 3 is illustrated in FIG. 3 as comprising fine refractory layers 4 formed from a finely divided refractory material and coarse refractory layers 5 formed from a coarsely divided refractory material. The fine refractory layers 4 and the coarse refractory layers 5 are alternately laminated. It should be noted that the first fine refractory layer 4 is in contact with the outer surface of the tubular ceramic preform 1.

The fine refractory layers 4 may be formed by preparing a slurry of finely divided refractory powder using colloidal silica or ethyl silicate hydrolyzate as a binder and applying the slurry to the outer surface of the tubular ceramic preform 1 or a subsequently coated coarse refractory layer. The coarse refractory layers 5 may be formed by applying coarsely divided refractory particles onto the coated slurry. In this way, any desired plies of the fine and coarse refractory layers are applied and laminated onto the tubular ceramic preform to fabricate the protective tube. The protective tube may be used as coated, that is, without any treatment after the necessary layers are applied and laminated. Alternatively, the slurry layer or layers thus applied are dried and sintered before the protective tube is used. In the former case of as coated protective tube, the fine refractory layers 4 are laminated in a slurry state, that is, in the co-presence of the finely divided refractory powder and the binder in the form of colloidal silica or ethyl silicate hydrolyzate. The coarse refractory layers 5 are held in place because coarse refractory particles are sandwiched between the adjoining fine refractory layers 4 in a slurry state and bound by the wetting interaction with the slurry. In the latter case of sintered protective tube, the fine refractory layers 4 consist of sintered and cemented fine refractory particles because decomposition residues like $SiO_2$ of the ethyl silicate or colloidal silica binder act as a cementing agent. Coarse refractory particles of the coarse refractory layers 5 are cemented or bound by the sandwiching fine refractory layers 4 after sintering while solid phase sintering occurs between some coarse refractory particles. It will be understood that the protective tube as coated, that is, having undergone no positive sintering is also sintered spontaneously during the subsequent use wherein it is immersed in a high temperature subject whose temperature is to be taken.

Since no compression molding is involved, the refractory coating 3 prepared as above is porous as a whole even in the sintered state and has increased voids particularly in the coarse refractory layers 5. Coarse particles are dispersed in the coarse refractory layers 5 with a weak or little bonding force acting between them while fine particles are relatively firmly bound in the fine refractory layers 4. When a thermal shock is applied to the refractory coating 3, little or no thermal crack is induced and propagated in the coarse refractory layers 5 where more voids are present and the bonding force is weak or little. Thermal cracks can be induced in the fine refractory layers 4, but their propagation is interrupted at the boundary with the coarse refractory layers 5, inhibiting further growth of thermal cracks. With respect to erosion by liquid metal during immersion of the protective tube therein, the coarse refractory layers 5 are relatively liable, but the fine refractory layers 4 where particles are relatively firmly bound are resistant. Then, the refractory coating 3 as a whole exhibits high resistance to both thermal shock and erosion by liquid metal. The formation of the refractory coating 3 on the tubular ceramic preform 1 protects the tube in that the possibility of any thermal shock creating any significant thermal cracks to unable further use is minimized and that it takes a long time until erosion proceeds to an unusable level. Consequently, the number of repeated uses and the serviceable life of the protective tube are remarkably increased.

The fine refractory layers 4 contain finely divided refractory particles having a particle size in the range of from 150 mesh (0.105 mm) to 500 mesh (0.028 mm). Finer particles having a particle size of less than 150 mesh tend to entrain air in preparing a slurry therefrom and thus require a longer time until a homogeneous slurry is obtained. This adds a cost to the expensiveness of finer particles themselves. No additional benefit is obtained with the use of such too finer particles. It is also difficult to obtain a homogeneous slurry and to form a closely packed fine refractory layer using larger particles having a particle size of more than 500 mesh. The preferred fine refractory particles are in the particle size range of from 200 mesh (0.074 mm) to 400 mesh (0.035 mm).

The coarse refractory layers 5 contain coarsely divided refractory particles having a particle size in the range of from 0.1 mm to 2.0 mm. With particles of less than 0.1 mm in size, it is difficult to establish a layer having a definite thickness. Since the coarse refractory layer 5 is prepared simply by adhering coarse refractory particles to the underlying fine refractory layer 4 in a slurry form, the thickness of the coarse refractory layer 5 predominantly depends on the size of particles involved. In order to insure that the total thickness of the refractory coating 3 exceeds a certain level, the use of coarse refractory particles having a particle size of less than 0.1 mm requires to increase the number of plies or the number of coating steps, adding to the fabricating cost. Moreover, the coarse refractory layer containing coarse refractory particles having a particle size of less than 0.1 mm is rather too closely packed to provide for thermal shock relaxation. With particle sizes in excess of 2.0 mm, the percent void of the layer is substantially increased to give rise to a strength problem. The preferred coarse refractory particles are in the particle size range of from 0.3 mm to 1.5 mm. The coarse refractory particles used in the coarse refractory layers 5 may preferably have a relatively wide distribution of particle size rather than being of a uniform particle size.

The finely divided refractory material used in the fine refractory layers 4 is preferably selected from zircon, high alumina, mullite, and zirconia. They may be used alone and a mixture of any two or more may also be used. Also the coarsely divided refractory material used in the coarse refractory layers 5 is preferably selected from zircon, high alumina, mullite, and zirconia. They may be used alone and a mixture of any two or more may also be used.

The total thickness of the refractory coating 3 may be determined depending on the temperature and type of a subject whose temperature is to be taken. Although no particular limit is imposed, the total thickness generally ranges from about 5 mm to about 7 mm. The wall thickness of the tubular ceramic preform 1 need not be particularly limited although it generally ranges from about 2 mm to about 3 mm. The protective tube as a whole eventually has a total wall thickness ranging from about 7 mm to about 10 mm.

The refractory coating 3 may be made up from at least one fine refractory layer 4 and at least one coarse refractory layer 5, that is, at least two layers in total. For better results, there are preferably applied at least two plies for each of the fine and coarse refractory layers, that is, at least four layers in total. Generally, six to ten layers in total are provided to insure the protective effect.

In the course of forming the refractory coating 3, the fine refractory layers 4 and the coarse refractory layers 5 become more irregular in their outer surface and thus somewhat interdigitated as they are placed more outside. It is thus difficult to precisely determine the thickness of the respective layers 4 and 5. In general, the thickness of the fine refractory layers 4 is determined by the viscosity of the slurry used and the thickness of the coarse refractory layer 5 is determined by the size of coarse particles used as previously mentioned.

Next, the process of making the thermocouple protective tubes according to the present invention will be described in detail.

At the outset, a tubular preform 1 of a suitable ceramic material as previously mentioned is prepared. The tubular ceramic preform may be formed by any well-known conventional processes as previously mentioned.

The fine refractory layers 4 and the coarse refractory layers 5 are alternately formed on the tubular preform 1 by alternately applying a slurry of finely divided refractory particles having a particle size of 150 to 500 mesh and then coarsely divided refractory particles having a particle size of 0.1 to 2.0 mm.

The slurry of fine refractory particles is prepared using a binder. Typical binders are colloidal silica and a hydrolyzate of ethyl silicate though other binders such as alumina-based binders may also be used. Preferred among the colloidal silica and ethyl silicate hydrolyzate are those having an $SiO_2$ concentration of about 15% to 45% by weight. The slurry of fine refractory particles in such a binder may be applied by any desired techniques, for example, by brush coating and spraying or by dipping the preform into the slurry.

The coarse refractory particles may be adhered to the preceding slurry coating by any desired techniques, for example, by spraying and sprinkling. The coarse refractory particles is kept adhered to the slurry coating or fine refractory layer 4 by the wetting interaction. In a general practice, a first ply of the fine refractory layer 4 is formed in close contact with the outer surface of the tubular preform 1, a second ply of the coarse refractory layer 5 is formed on the first layer, and subsequently fine and coarse refractory layers are alternately formed thereon.

In this way, any desired plies of the fine and coarse refractory layers 4 and 5 are applied and laminated onto the tubular ceramic preform to fabricate the protective tube. The protective tube may be used as coated, that is, either without any treatment after the necessary layers are applied and laminated or merely after drying the slurry. Alternatively, the slurry layer or layers thus applied are dried and sintered before the protective tube is used. The protective tube as coated, that is, having undergone no positive sintering is also sintered spontaneously during the subsequent use wherein it is immersed in a high temperature subject whose temperature is to be taken. Of course, the protective tube is stable during shelf storage when a positive sintering has been carried out.

The sintering after drying of the slurry coatings is generally carried out by heating at a temperature of 800° C. or higher preferably for at least one hour. Sintering temperatures of lower than 800° C. are too low to fully sinter and cement fine refractory particles in the fine refractory layer, failing to achieve a sufficient mechanical strength. The upper limit of sintering temperature is not particularly determined though the usual sintering temperature is desirably up to 1,400° or 1,500° C. from the standpoint of preventing the ceramic material from softening. After sintering, the fine refractory particles are relatively closely packed or firmly cemented in the fine refractory layers 4 because decomposition residues like $SiO_2$ and $Al_2O_3$ of the binder in the slurry act as a cementing agent. Coarse refractory particles of the coarse refractory layers 5 are cemented or bound by the sandwiching fine refractory layers 4.

EXAMPLES

A thermocouple protective tube as illustrated in FIGS. 1 to 3 was prepared using a tubular preform of recrystallized alumina ceramic material having an outside diameter of 13 mm, an inside diameter of 9 mm, and a length of 500 mm. The finely divided refractory material used was one selected from zircon, high alumina, mullite, and zirconia and having a particle size between 200 mesh and 400 mesh. The coarsely divided refractory material used was one selected from zircon, high alumina, mullite, and zirconia and having a particle size between 0.3 mm and 1.5 mm. A slurry of the finely divided refractory material and a mass of the coarsely divided refractory material were alternately applied onto the preform to form 6 to 10 layers in total. The slurry of the finely divided refractory material for fine refractory layers contained as a binder an aqueous colloidal silica or an ethyl silicate hydrolyzate both having an SiO$_2$ concentration of 20%. Refractory coatings resulted with a thickness varying from about 6 mm for six layers applied to about 10 mm for ten layers applied. Some of the thus prepared tubes having a refractory coating thereon were further sintered at a temperature of 900° C. for one hour.

The as-coated protective tubes, sintered protective tubes, and a prior art protective tube free of a refractory coating (which is just the same as the tubular preform made of high alumina ceramic material) as a comparative sample were examined for melting loss (that is, resistance to erosion by molten metal) and resistance to thermal shock by the following procedures.

The melting loss was determined by immersing the protective tubes for 24 hours in a melt of cast stainless steel conforming to JIS SCS13 held at 1,400° to 1,450° C. The protective tubes were preheated at temperatures of 500° C. or 800° C., then immersed in the melt at 1,400° to 1,450° C., and thereafter observed whether cracks occurred in them due to thermal cracking. Further, the protective tubes were subjected to repetitive preheating cycles to determine the number of repetitive preheating cycles that the protective tubes could withstand until they failed to properly perform. Each cycle involved preheating at a temperature of 1,000° C., immersing in the melt at 1,400° to 1,450° C. for 8 hours, taking out of the melt, and allowing to cool. The results are shown in Tables 2 and 3 along with the parameters used in the preparation of the protective tubes.

In each of these evaluation procedures, three samples prepared under the identical conditions were tested for each type of protective tube. The melting loss is marked "O" when little or no melting loss is observed, "X" when the melting loss is so great as to render the protective tube unusable, and "Δ" when a moderate melting loss is observed. The cracking due to thermal shock is marked "O" when cracks occur in neither of the three samples, "Δ" when cracks occur in one or two samples, and "X" when cracks occur in all the three samples. The number of permissible repetitive preheating cycles which is simply designated as the number of use in the Tables is given as an average of the three samples. It should be noted that this thermal shock test is repeated only five cycles.

TABLE 2

| | Binder = aqueous colloidal silica | | | |
|---|---|---|---|---|
| Sample No. | Fine refractory | Coarse refractory | Total plies | Sintering |
| 1 | zircon | zircon | 6 | no |
| 2 | " | " | 6 | yes |
| 3 | " | " | 10 | no |
| 4 | " | " | 10 | yes |
| 5 | high alumina | high alumina | 6 | no |
| 6 | " | " | 6 | yes |
| 7 | " | " | 10 | no |
| 8 | " | " | 10 | yes |
| 9 | mullite | mullite | 6 | no |
| 10 | " | " | 6 | yes |
| 11 | " | " | 10 | no |
| 12 | " | " | 10 | yes |
| 13 | zirconia | zirconia | 6 | no |
| 10 | " | " | 6 | yes |
| 11 | " | " | 10 | no |
| 12 | " | " | 10 | yes |

| Sample No. | Melting loss | Cracking, preheated @500° C. | @800° C. | Number of use |
|---|---|---|---|---|
| 1 | Δ | Δ | O | 2.3 |
| 2 | Δ | Δ | O | 2.3 |
| 3 | O | Δ | O | 4 |
| 4 | O | O | O | 4.3 |
| 5 | X | Δ | O | 1.3 |
| 6 | X | O | O | 1.3 |
| 7 | Δ | O | O | 1.7 |
| 8 | Δ | O | O | 2.3 |
| 9 | Δ | Δ | O | 1.7 |
| 10 | Δ | O | O | 2 |
| 11 | Δ | O | O | 3 |
| 12 | Δ | O | O | 3 |
| 13 | O | O | O | >5 |
| 14 | O | O | O | >5 |
| 15 | O | O | O | >5 |
| 16 | O | O | O | >5 |

TABLE 3

| | | | Binder = ethyl silicate hydrolyzate | | | | |
|---|---|---|---|---|---|---|---|
| Sample No. | Fine refractory | Coarse refractory | Total plies | Sintering | Melting loss | Cracking, preheated @ 500° C. | @ 800° C. | Number of use |
| 17 | zircon | zircon | 6 | no | Δ | Δ | O | 3 |
| 18 | " | " | 6 | yes | Δ | O | O | 2.7 |
| 19 | " | " | 10 | no | O | Δ | O | 3.7 |
| 20 | " | " | 10 | yes | O | O | O | 3.7 |
| 21 | high alumina | high alumina | 6 | no | X | Δ | O | 1.3 |
| 22 | " | " | 6 | yes | X | O | O | 1.3 |
| 23 | " | " | 10 | no | Δ | O | O | 2 |
| 24 | " | " | 10 | yes | Δ | O | O | 1.7 |
| 25 | mullite | mullite | 6 | no | Δ | Δ | O | 2 |
| 26 | " | " | 6 | yes | Δ | O | O | 2.3 |
| 27 | " | " | 10 | no | Δ | O | O | 3 |
| 28 | " | " | 10 | yes | Δ | O | O | 3.3 |
| 29 | zirconia | zirconia | 6 | no | O | O | O | >5 |
| 30 | " | " | 6 | yes | O | O | O | >5 |
| 31 | " | " | 10 | no | O | O | O | >5 |
| 32 | " | " | 10 | yes | O | O | O | >5 |
| 33 | comparative sample | | | | — | X | Δ | 1 |

As evident from the data in Tables 2 and 3, all the thermocouple protective tubes of the present invention (sample Nos. 1 through 32) undergo less cracking by a thermal shock and withstand a more number of repetitive uses, i.e., is more durable than the conventional protective tube having no refractory coating (sample No. 33) although some minor variations are found depending on the type of finely divided refractory material and coarsely divided refractory material, the number of plies, and the type of binder used, and whether sintering is conducted.

It can be seen that the protective tubes show a noticeable difference in durability depending on the type of refractory materials and the number of plies employed in the refractory coating. This, in turn, means that a protective tube with a good compromise of manufacturing cost and durability can be manufactured simply by changing the type of refractory materials and the number of plies in accordance with the type and temperature of a medium under observation. The increased durability indicates that inside tubular preforms composed of a less durable, less expensive ceramic material may be used to achieve a degree of durability at least equal to that of the conventional protective tubes.

As mentioned above, the thermocouple protective tubes of the present invention are significantly improved in thermal shock resistance and resistance to melting loss by liquid metal over the conventional ones. The present protective tubes are sufficiently durable to increase the serviceable life and usable cycles. Since the degree of durability of protective tubes can be readily controlled by a proper choice of the type of refractory materials and the number of plies, a protective tube best suited for the particular type and temperature of a medium under observation may be readily prepared while finding a compromise between manufacturing cost and durability. Since the thermocouple protective tube of the present invention is improved in durability by providing a refractory coating of laminate structure on the outer surface of a tubular ceramic preform, the tubular preform itself may be made from a relatively lower grade, less expensive ceramic material so that the overall manufacturing cost is not remarkably increased.

We claim:

1. A protective tube for a thermocouple comprising a tubular preform of ceramic material, wherein
   at least one fine refractory layer comprising a finely divided refractory material having a particle size ranging from 150 mesh to 500 mesh and
   at least one coarse refractory layer comprising a coarsely divided refractory material having a particle size ranging from 0.1 mm to 2.0 mm are alternately laminated on the outer surface of the tubular preform.

2. The thermocouple protective tube of claim 1 comprising more than one fine refractory layer and more than one coarse refractory layer.

3. The thermocouple protective tube of claim 1 wherein the finely divided refractory material is at least one member selected from the group consisting of zircon, high alumina, mullite, and zirconia.

4. The thermocouple protective tube of claim 1 wherein the coarsely divided refractory material is at least one member selected from the group consisting of zircon, high alumina, mullite, and zirconia.

5. A process of making a protective tube for a thermocouple, comprising alternately applying a slurry of a finely divided refractory material having a particle size ranging from 150 mesh to 500 mesh and then a coarsely divided refractory material having a particle size ranging from 0.1 mm to 2 mm onto the outer surface of a tubular preform of ceramic material to form a plurality of coating layers.

6. The process of claim 5 wherein the steps of alternately applying the finely divided refractory material slurry and the coarsely divided refractory material are carried out at least twice.

7. The process of claim 5 wherein said slurry contains colloidal silica or a hydrolyzate of ethyl silicate as a binder.

8. The process of claim 5 which further comprises the step of sintering the coated preform at a temperature of at least 800° C.

* * * * *